(12) United States Patent
Matsuoka

(10) Patent No.: US 10,634,228 B2
(45) Date of Patent: Apr. 28, 2020

(54) TORQUE CONVERTER

(71) Applicant: EXEDY Corporation, Neyagawa-shi, Osaka (JP)

(72) Inventor: Yoshihiro Matsuoka, Neyagawa (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 89 days.

(21) Appl. No.: 16/163,768

(22) Filed: Oct. 18, 2018

(65) Prior Publication Data

US 2019/0162285 A1 May 30, 2019

(30) Foreign Application Priority Data

Nov. 30, 2017 (JP) .................................. 2017-230281

(51) Int. Cl.
  *F16H 45/02* (2006.01)
(52) U.S. Cl.
  CPC ....... *F16H 45/02* (2013.01); *F16H 2045/021* (2013.01); *F16H 2045/0215* (2013.01); *F16H 2045/0231* (2013.01); *F16H 2045/0278* (2013.01)
(58) Field of Classification Search
  None
  See application file for complete search history.

(56) References Cited

U.S. PATENT DOCUMENTS

| 4,926,988 A * | 5/1990 | Kundermann | F16H 45/02 192/212 |
| 5,799,762 A * | 9/1998 | Hinkel | F16H 45/02 192/3.29 |
| 2007/0074943 A1 * | 4/2007 | Hemphill | F16H 45/02 192/3.25 |

FOREIGN PATENT DOCUMENTS

JP  2010-053963 A  3/2010

* cited by examiner

*Primary Examiner* — Timothy Hannon
(74) *Attorney, Agent, or Firm* — United IP Counselors, LLC

(57) ABSTRACT

A torque converter includes a front cover, an impeller, a turbine, a piston, an internal hydraulic chamber, an external hydraulic chamber and a seal mechanism. The impeller is fixed to the front cover. The turbine is disposed in opposition to the impeller. The piston is disposed between the front cover and the turbine so as to be movable in an axial direction. The piston is engaged by friction with the turbine. The internal hydraulic chamber is delimited by the turbine and the piston. The external hydraulic chamber is obtained by excluding the internal hydraulic chamber from a hydraulic chamber delimited by the front cover and the impeller. The seal mechanism is disposed between the turbine and the piston, the seal mechanism blocking hydraulic oil from flowing into the internal hydraulic chamber from the external hydraulic chamber.

12 Claims, 6 Drawing Sheets

TORQUE CONVERTER

CROSS-REFERENCE TO RELATED APPLICATIONS

This application claims priority to Japanese Patent Application No. 2017-230281 filed on Nov. 30, 2017, the entirety of which is hereby incorporated by reference in its entirety.

BACKGROUND

Technical Field

The present disclosure relates to a torque converter.

Background Information

A torque converter includes an impeller and a turbine, and transmits a torque from the impeller to the turbine through hydraulic oil contained in the interior thereof. The impeller is fixed to a front cover to which a torque is inputted from an engine. The turbine is disposed in opposition to the impeller. When the impeller is rotated, the hydraulic oil flows from the impeller to the turbine. The flow of the hydraulic oil rotates the turbine, whereby the torque is outputted.

Additionally, the torque converter includes a lock-up device. When the lock-up device is turned on, the torque from the front cover is mechanically transmitted to the turbine, and is outputted therefrom to an input shaft of a transmission.

For example, as described in Japan Laid-open Patent Application Publication No. 2010-53963, the lock-up device of the torque converter includes a piston. The piston is movable in an axial direction. When the piston is moved toward the turbine and is engaged by friction therewith, the lock-up device is turned on.

BRIEF SUMMARY

In the torque converter configured as described above, it is preferable to exert good responsiveness of the piston when the lock-up device is turned on. In view of this, it is an object of the present disclosure to reliably achieve good responsiveness of the piston.

As a result of keen study, the inventor of the present advancement found that difference in pressure was unlikely to be produced between an external hydraulic chamber and an internal hydraulic chamber in occurrence of leakage of hydraulic pressure from the external hydraulic chamber to the internal hydraulic chamber through a gap between the turbine and the piston, whereby the responsiveness of the piston was deteriorated.

In view of the above, a torque converter according to an aspect of the present disclosure includes a front cover, an impeller, a turbine, a piston, an internal hydraulic chamber, an external hydraulic chamber and a seal mechanism. The impeller is fixed to the front cover. The turbine is disposed in opposition to the impeller. The piston is disposed between the front cover and the turbine so as to be movable in an axial direction. The piston is configured to be capable of being engaged by friction with the turbine. The internal hydraulic chamber is a hydraulic chamber delimited by the turbine and the piston. The external hydraulic chamber is a hydraulic chamber obtained by excluding the internal hydraulic chamber from a hydraulic chamber delimited by the front cover and the impeller. The seal mechanism is disposed between the turbine and the piston, and is configured to block a hydraulic oil from flowing into the internal hydraulic chamber from the external hydraulic chamber.

According to this configuration, the hydraulic oil can be blocked from flowing from the external hydraulic chamber to the internal hydraulic chamber by the seal mechanism. Therefore, difference in pressure between the external hydraulic chamber and the internal hydraulic chamber can be kept by preventing pressure leakage from the external hydraulic chamber to the internal hydraulic chamber. As a result, it is possible to reliably achieve good responsiveness of the piston.

Preferably, the seal mechanism allows the hydraulic oil from flowing out of the internal hydraulic chamber to the external hydraulic chamber.

Preferably, when a hydraulic pressure is higher in the external hydraulic chamber than in the internal hydraulic chamber, the seal mechanism blocks the hydraulic oil from flowing between the external hydraulic chamber and the internal hydraulic chamber. Contrarily, when the hydraulic pressure is higher in the internal hydraulic chamber than in the external hydraulic chamber, the seal mechanism preferably allows the hydraulic oil to flow between the external hydraulic chamber and the internal hydraulic chamber.

Preferably, the seal mechanism includes an annular groove and a seal ring. The annular groove is provided on one of the piston and the turbine. The seal ring is movable in directions approaching to and separating from the internal hydraulic chamber within the annular groove. Preferably, the annular groove is delimited by a bottom surface, a first inner wall surface and a second inner wall surface. The first inner wall surface is located on an internal hydraulic chamber side. The second inner wall surface is located on an opposite side of the first inner wall surface. Preferably, the seal ring includes a first lateral surface, a second lateral surface, an inner peripheral surface and an outer peripheral surface. The first lateral surface is opposed to the first inner wall surface. The second lateral surface is opposed to the second inner wall surface. The inner peripheral surface is opposed to the bottom surface. The outer peripheral surface makes contact with the other of the piston and the turbine. Preferably, either the second inner wall surface or the second lateral surface includes an oil groove.

Preferably, the torque converter further includes a friction member attached to either the turbine or the piston.

Preferably, the seal mechanism is disposed on an inner side of the friction member in a radial direction.

Preferably, the seal mechanism is disposed on an outer side of the friction member in the radial direction.

Preferably, the front cover includes a disc portion and an inner tubular portion extending from an inner peripheral end of the disc portion in the axial direction. Preferably, the turbine includes a turbine hub disposed on an inner side of the inner tubular portion in the radial direction. Preferably, the piston is disposed on an outer peripheral surface of the inner tubular portion so as to slide thereon in the axial direction. Preferably, the torque converter further includes a bearing member disposed between the turbine hub and the inner tubular portion in the radial direction. According to this configuration, the piston can be prevented from being displaced in the radial direction. As a result, an interval can be kept constant between the piston and the turbine in the radial direction.

Preferably, the bearing member is disposed between the turbine hub and the disc portion in the axial direction.

Preferably, the bearing member includes an oil groove communicating with the internal hydraulic chamber.

Preferably, the piston is engaged by friction with an outer peripheral end of the turbine.

Preferably, the torque converter further includes a damper mechanism coupling the piston and the front cover.

Overall, according to the present disclosure, it is possible to reliably achieve good responsiveness of a piston.

BRIEF DESCRIPTION OF THE DRAWINGS

Referring now to the attached drawings which form a part of this original disclosure.

DETAILED DESCRIPTION OF EMBODIMENTS

[Entire Configuration]

Figure 1:
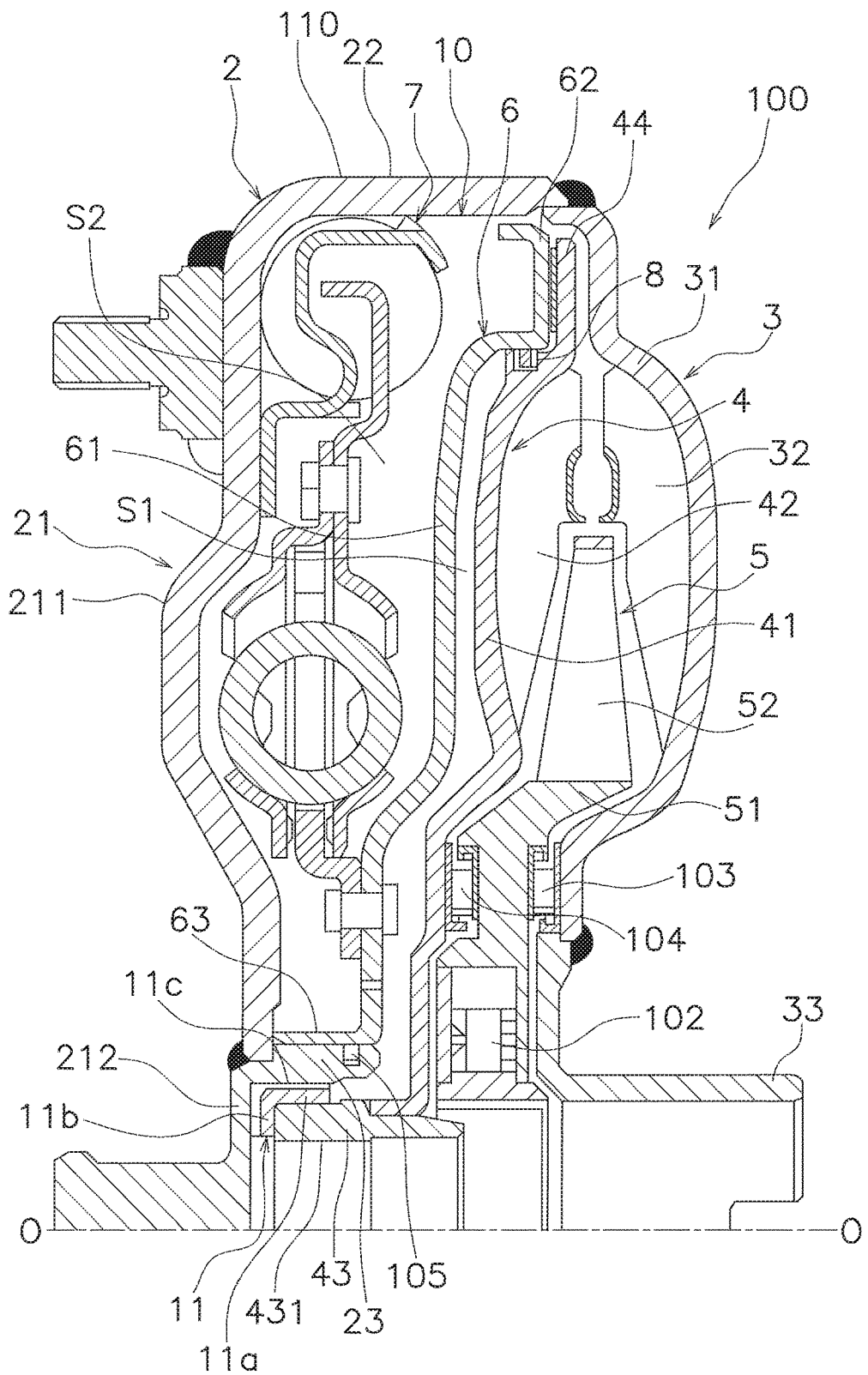
FIG. 1 is a cross-sectional view of a torque converter.

FIG. 1 is a cross-sectional view of a torque converter 100 according to a preferred embodiment of the present disclosure. In the following explanation, the term "axial direction" means an extending direction of a rotational axis O of the torque converter 100. On the other hand, the term "radial direction" means a radial direction of an imaginary circle about the rotational axis O, whereas the term "circumferential direction" means a circumferential direction of the imaginary circle about the rotational axis O. It should be noted that an engine is disposed on the left side in FIG. 1 whereas a transmission is disposed on the right side in FIG. 1, although the engine and the transmission are not shown in FIG. 1.

The torque converter 100 is rotatable about the rotational axis O. The torque converter 100 includes a front cover 2, an impeller 3, a turbine 4, a stator 5 and a lock-up device 10.

[Front Cover 2]

A torque is inputted to the front cover 2 from the engine. The front cover 2 includes a disc portion 21, an outer tubular portion 22 and an inner tubular portion 23.

The disc portion 21 includes an outer disc portion 211 and an inner disc portion 212. The outer disc portion 211 and the inner disc portion 212 are provided as members separated from each other. The outer disc portion 211 and the inner disc portion 212 are fixed to each other by, for instance, welding or so forth. It should be noted that the disc portion 21 can be provided as a single member without being divided into the outer disc portion 211 and the inner disc portion 212.

The outer tubular portion 22 extends from the outer peripheral end of the disc portion 21 toward the impeller 3 in the axial direction. Detailedly, the outer tubular portion 22 extends from the outer peripheral end of the outer disc portion 211 in the axial direction. It should be noted that the outer tubular portion 22 and the outer disc portion 211 are provided as a single member.

The inner tubular portion 23 extends from the inner peripheral end of the disc portion 21 toward the impeller 3 in the axial direction. Detailedly, the inner tubular portion 23 extends from the outer peripheral end of the inner disc portion 212 in the axial direction. It should be noted that the inner tubular portion 23 and the inner disc portion 212 are provided as a single member.

[Impeller 3]

The impeller 3 is fixed to the front cover 2. The impeller 3 includes an impeller shell 31, a plurality of impeller blades 32 and an impeller hub 33. The impeller shell 31 is fixed to the front cover 2 by, for instance, welding.

The impeller blades 32 are fixed to the inner surface of the impeller shell 31. The impeller hub 33 is fixed to the inner peripheral part of the impeller shell 31 by welding or so forth.

[Turbine 4]

The turbine 4 is disposed in opposition to the impeller 3. The turbine 4 includes a turbine shell 41, a plurality of turbine blades 42 and a turbine hub 43. The turbine blades 42 are fixed to the inner surface of the turbine shell 41 by brazing or so forth.

The turbine hub 43 is fixed to the turbine shell 41 by, for instance, welding or so forth. The turbine hub 43 is provided with a spline hole 431. An input shaft of the transmission is spline-coupled to the spline hole 431.

The turbine hub 43 is disposed inside the inner tubular portion 23 of the front cover 2 in the radial direction. The turbine hub 43 is disposed away from the inner tubular portion 23 at an interval in the radial direction. Additionally, the turbine hub 43 is disposed away from the disc portion 21 of the front cover 2 at an interval in the axial direction. Detailedly, the turbine hub 43 is disposed away from the inner disc portion 212 at an interval in the axial direction.

Additionally, the turbine 4 further includes a pressure receiving portion 44. The pressure receiving portion 44 is provided as the outer peripheral end of the turbine shell 41. The pressure receiving portion 44 is made in the shape of a planar annulus. The principal surface of the pressure receiving portion 44 faces the axial direction. The pressure receiving portion 44 is disposed outside a torus of the torque converter 100. It should be noted that the torus is formed by the impeller 3 and the turbine 4 as a space of a flow pathway for hydraulic oil.

[Bearing Member]

A bearing member 11 is disposed between the turbine hub 43 and the front cover 2. Detailedly, the bearing member 11 is disposed between the turbine hub 43 and the inner tubular portion 23 in the radial direction. Additionally, the bearing member 11 is disposed between the turbine hub 43 and the disc portion 21 in the axial direction. Detailedly, the bearing member 11 is disposed between the turbine hub 43 and the inner disc portion 212 in the axial direction.

The bearing member 11 is made of, for instance, resin. The bearing member 11 includes a first portion 11a and a second portion 11b. The first portion 11a extends in the axial direction, whereas the second portion 11b extends in the radial direction. The first portion 11a has a cylindrical shape. The first portion 11a is disposed between the turbine hub 43 and the inner tubular portion 23 in the radial direction. The outer peripheral surface of the first portion 11a makes contact with the inner peripheral surface of the inner tubular portion 23, while the inner peripheral surface of the first portion 11a makes contact with the outer peripheral surface of the turbine hub 43. With the bearing member 11, an interval can be kept between a piston 6 and the turbine 4 in the radial direction.

The second portion 11b has an annular shape. The second portion 11b is disposed between the disc portion 21 and the turbine hub 43 in the axial direction. The second portion 11b makes contact at one axial surface thereof with the disc portion 21, while making contact at the other axial surface thereof with the turbine hub 43.

The bearing member 11 includes at least one oil groove 11c communicating with an internal hydraulic chamber S1. The hydraulic oil is supplied to the internal hydraulic chamber S1 through the at least one oil groove 11c. The at least one oil groove 11c is provided on, for instance, the outer or inner peripheral surface of the bearing member 11. The at least one oil groove 11c extends on the first portion 11a in the axial direction. Additionally, the at least one oil groove 11c extends on the second portion 11b in the radial direction. The at least one oil groove 11c is provided as, for instance, a plurality of oil grooves aligned at intervals in the circumferential direction.

[Stator 5]

The stator 5 is configured to regulate the flow of hydraulic oil returning from the turbine 4 to the impeller 3. The stator 5 is rotatable about the rotational axis O. Detailedly, the stator 5 is supported by a stationary shaft (not shown in the drawings) through a one-way clutch 102. The stator 5 is disposed between the impeller 3 and the turbine 4.

The stator 5 includes a stator carrier 51 having a disc shape and a plurality of stator blades 52 attached to the outer peripheral surface of the stator carrier 51. It should be noted that a first thrust bearing 103 is disposed between the stator carrier 51 and the impeller hub 33, whereas a second thrust bearing 104 is disposed between the stator carrier 51 and the turbine shell 41.

[Lock-Up Device 10]

The lock-up device 10 is a device for mechanically transmitting the torque from the front cover 2 to the turbine 4, and is disposed between the front cover 2 and the turbine 4 in the axial direction. The lock-up device 10 includes the piston 6, a damper mechanism 7 and a seal mechanism 8.

[Piston]

The piston 6 is disposed between the front cover 2 and the turbine 4 so as to be movable in the axial direction. Detailedly, the piston 6 is disposed to be slidable on the outer peripheral surface of the inner tubular portion 23 in the axial direction. Additionally, the piston 6 is rotatable relatively to the inner tubular portion 23.

The piston 6 is configured to be capable of being engaged by friction with the turbine 4. The piston 6 includes a disc portion 61, a pressure applying portion 62 and a slide portion 63.

The outer peripheral surface of the piston 6 is disposed not in contact with the inner peripheral surface of the front cover 2 and that of the impeller 3. In other words, a gap is produced between the outer peripheral surface of the piston 6 and the inner peripheral surface of an outer peripheral wall portion 110 in the radial direction. It should be noted that the outer peripheral wall portion 110 is provided as part of both the front cover 2 and the impeller 3.

The disc portion 61 is shaped along the turbine shell 41. The disc portion 61 is disposed at an interval from the turbine shell 41 in the axial direction.

Figure 2:
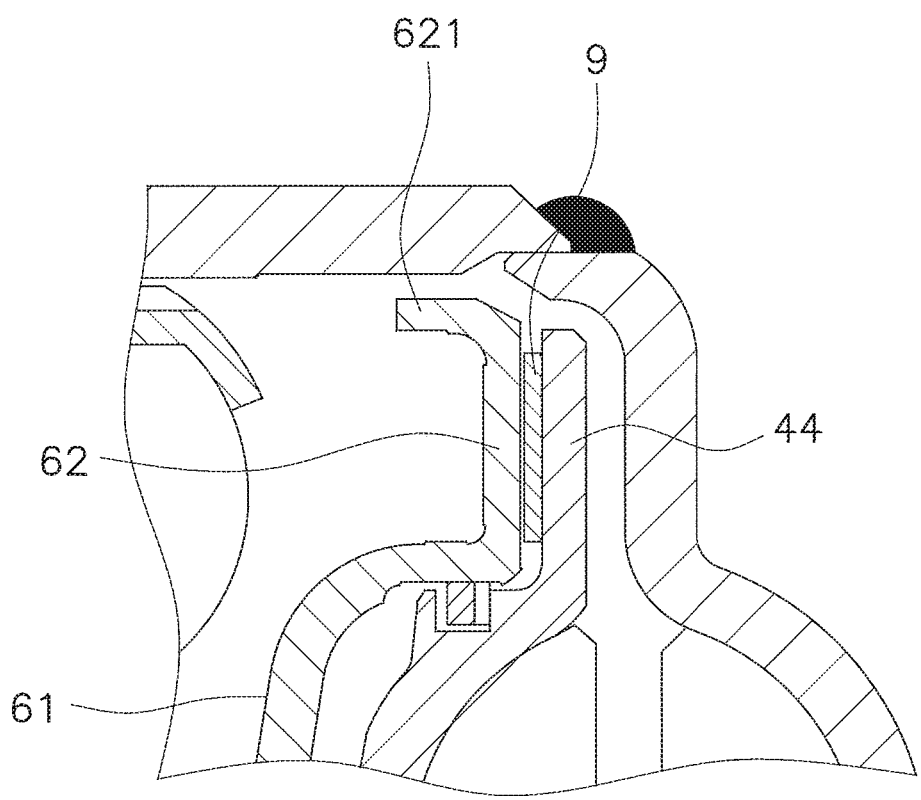
FIG. 2 is an enlarged cross-sectional view of the torque converter.

As shown in FIG. 2, the pressure applying portion 62 has an annular shape. The pressure applying portion 62 is provided as the outer peripheral end of the disc portion 61. The principal surface of the pressure applying portion 62 faces the axial direction. The principal surface of the pressure applying portion 62 extends approximately in parallel to that of the pressure receiving portion 44.

The pressure applying portion 62 is configured to press the pressure receiving portion 44 through a friction member 9. When the pressure applying portion 62 thus presses the pressure receiving portion 44 through the friction member 9, the piston 6 is engaged by friction with the turbine 4. It should be noted that the friction member 9 is fixed to the pressure receiving portion 44, but alternatively, can be fixed to the pressure applying portion 62. The friction member 9 has an annular shape.

The pressure applying portion 62 is bent at an outer peripheral end 621 toward the front cover 2 in the axial direction. In other words, the outer peripheral end 621 of the pressure applying portion 62 has a cylindrical shape and extends in the axial direction. The outer peripheral surface of the outer peripheral end 621 of the pressure applying portion 62 is disposed on the outer side of the outer peripheral end of the pressure receiving portion 44 in the radial direction. The outer peripheral surface of the outer peripheral end 621 of the pressure applying portion 62 is disposed at an interval from the inner peripheral surface of the outer tubular portion 22 of the front cover 2.

As shown in FIG. 1, the slide portion 63 is formed by bending the inner peripheral end of the disc portion 61 toward the front cover 2. The slide portion 63 is supported by the outer peripheral surface of the inner tubular portion 23 of the front cover 2 so as to be slidable thereon. A seal member 105 is provided on the outer peripheral surface of the inner tubular portion 23. The seal member 105 seals between the inner peripheral surface of the slide portion 63 of the piston 6 and the outer peripheral surface of the inner tubular portion 23.

[Damper Mechanism]

Figure 3:
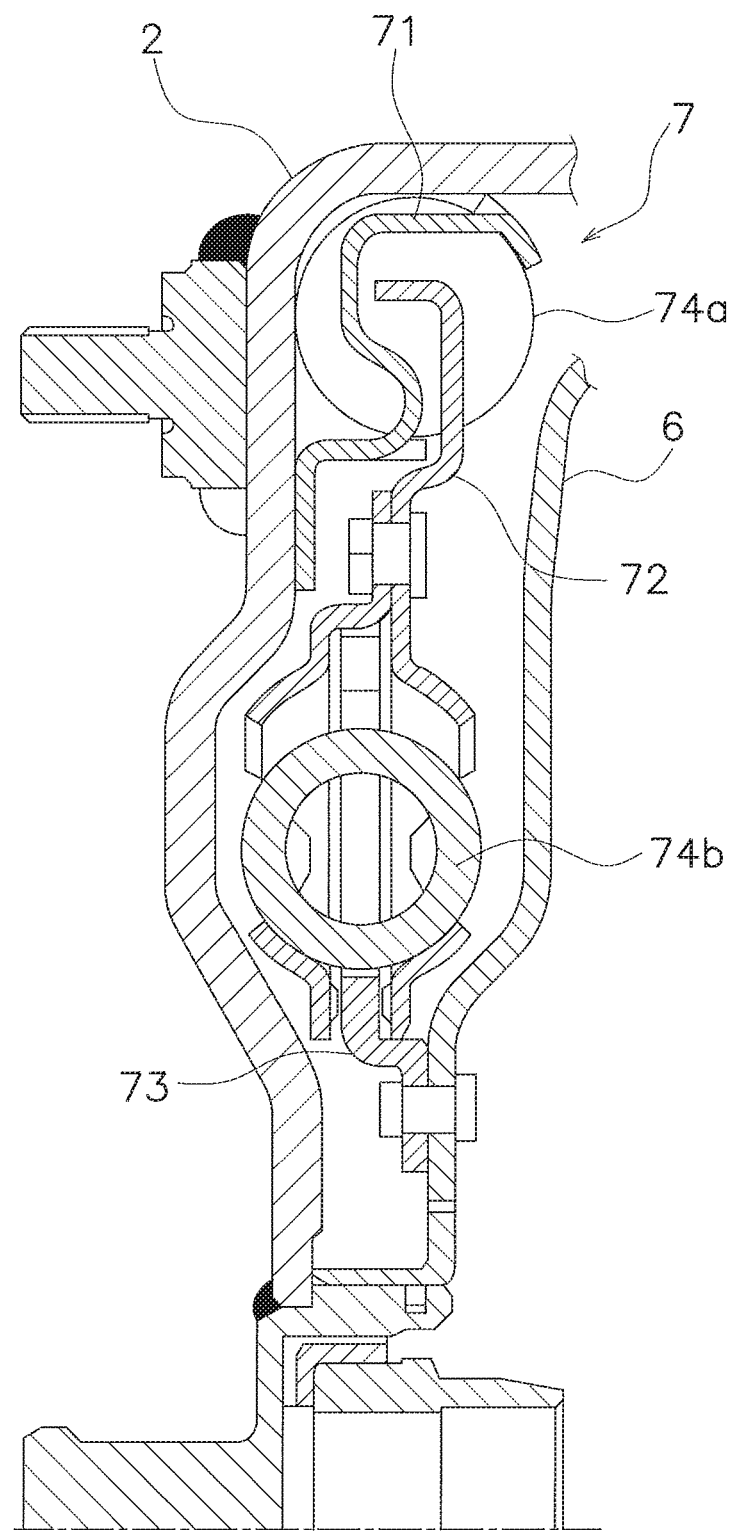
FIG. 3 is a cross-sectional view of a damper mechanism.

As shown in FIG. 3, the damper mechanism 7 is disposed between the front cover 2 and the piston 6 in the axial direction. The damper mechanism 7 elastically couples the front cover 2 and the piston 6. The damper mechanism 7 includes a drive plate 71, an intermediate plate 72, a driven plate 73, a plurality of outer peripheral side torsion springs 74a and a plurality of inner peripheral side torsion springs 74b.

The drive plate 71 has a disc shape and is fixed at the inner peripheral end thereof to a lateral surface of the front cover 2 by welding or so forth. The drive plate 71 is engaged at the outer peripheral end thereof with the outer peripheral side torsion springs 74a.

The intermediate plate 72 couples the outer peripheral side torsion springs 74a and the inner peripheral side torsion springs 74b. The intermediate plate 72 is engaged at the outer peripheral end thereof with the outer peripheral side torsion springs 74a. Additionally, the intermediate plate 72 is engaged at the inner peripheral end thereof with the inner peripheral side torsion springs 74b.

The driven plate 73 is attached at the inner peripheral end thereof to the piston 6. The driven plate 73 is attached to the piston 6 by, for instance, at least one rivet or so forth. Additionally, the driven plate 73 is engaged with the inner peripheral side torsion springs 74b.

With the configuration described above, the torque inputted to the front cover 2 is transmitted to the piston 6 through the drive plate 71, the outer peripheral side torsion springs 74a, the intermediate plate 72, the inner peripheral side torsion springs 74b and the driven plate 73.

[Hydraulic Chambers]

Figure 4:
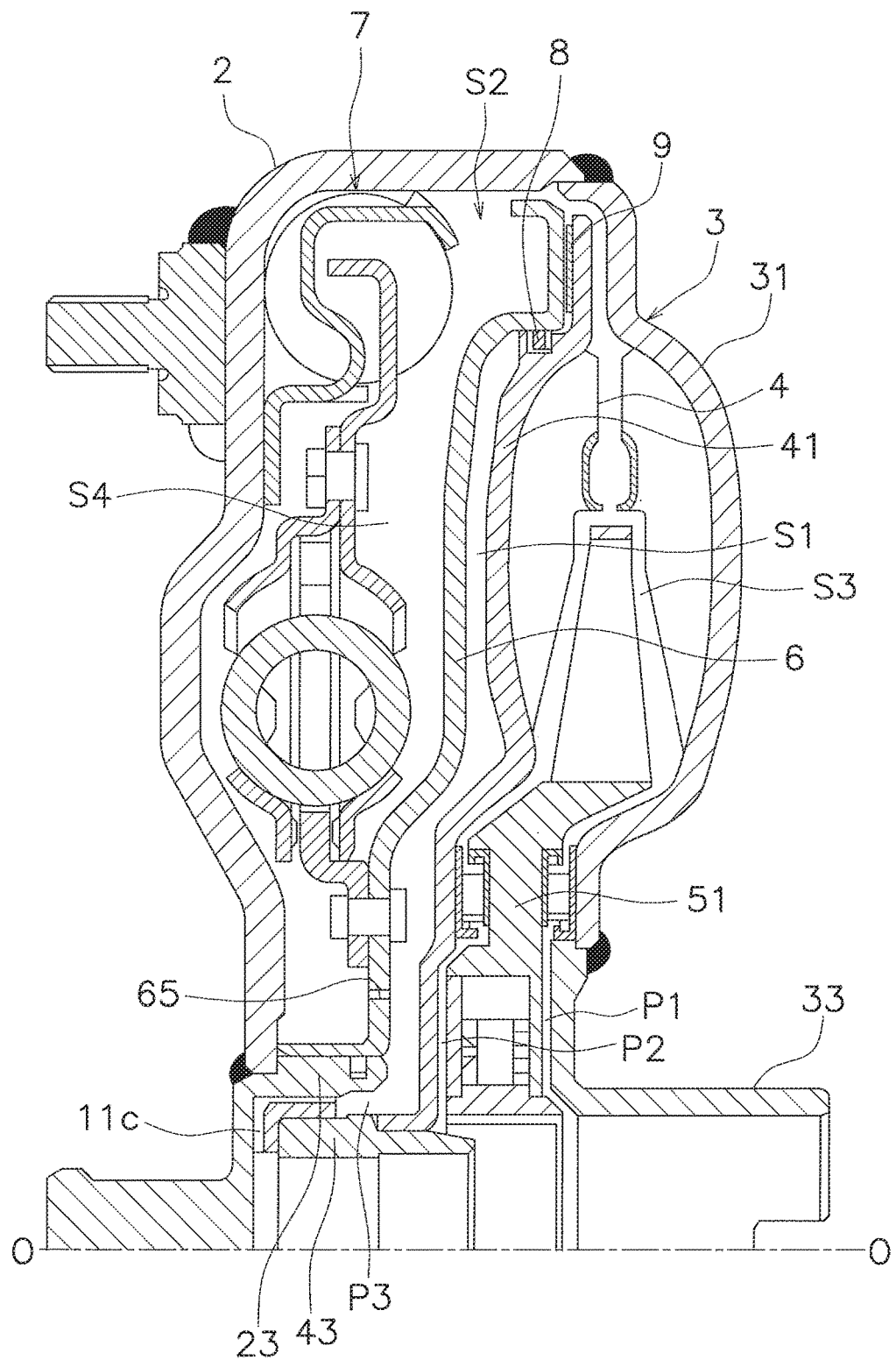
FIG. 4 is a cross-sectional view of a hydraulic circuit of the torque converter.

As shown in FIG. 4, the torque converter 100 includes the internal hydraulic chamber S1 and an external hydraulic chamber S2. The internal hydraulic chamber S1 is delimited by the turbine 4 and the piston 6. Detailedly, the internal hydraulic chamber S1 is delimited by the turbine shell 41 and the piston 6.

The external hydraulic chamber S2 is a hydraulic chamber obtained by excluding the internal hydraulic chamber S1 from a hydraulic chamber delimited by the front cover 2 and the impeller shell 31. The external hydraulic chamber S2 is composed of a first hydraulic chamber S3 and a second hydraulic chamber S4. The first hydraulic chamber S3 is delimited by the impeller shell 31 and the turbine shell 41. In other words, the first hydraulic chamber S3 is a so-called torus. The second hydraulic chamber S4 is delimited by the front cover 2 and the piston 6. The damper mechanism 7 is disposed inside the second hydraulic chamber S4.

[Seal Mechanism]

The seal mechanism 8 is disposed on the inner side of the friction member 9 in the radial direction. The seal mechanism 8 is configured to block the hydraulic oil from flowing into the internal hydraulic chamber S1 from the external hydraulic chamber S2. The seal mechanism 8 is provided on the outer peripheral end of the piston 6. Additionally, the seal mechanism 8 is configured to allow the hydraulic oil from flowing out of the internal hydraulic chamber S1 to the external hydraulic chamber S2.

When the hydraulic pressure is higher in the external hydraulic chamber S2 than in the internal hydraulic chamber S1, the seal mechanism 8 blocks the hydraulic oil from flowing between the external hydraulic chamber S2 and the internal hydraulic chamber S1. Contrarily, when the hydraulic pressure is higher in the internal hydraulic chamber S1 than in the external hydraulic chamber S2, the seal mechanism 8 allows the hydraulic oil to flow between the external hydraulic chamber S2 and the internal hydraulic chamber S1.

Figure 5:
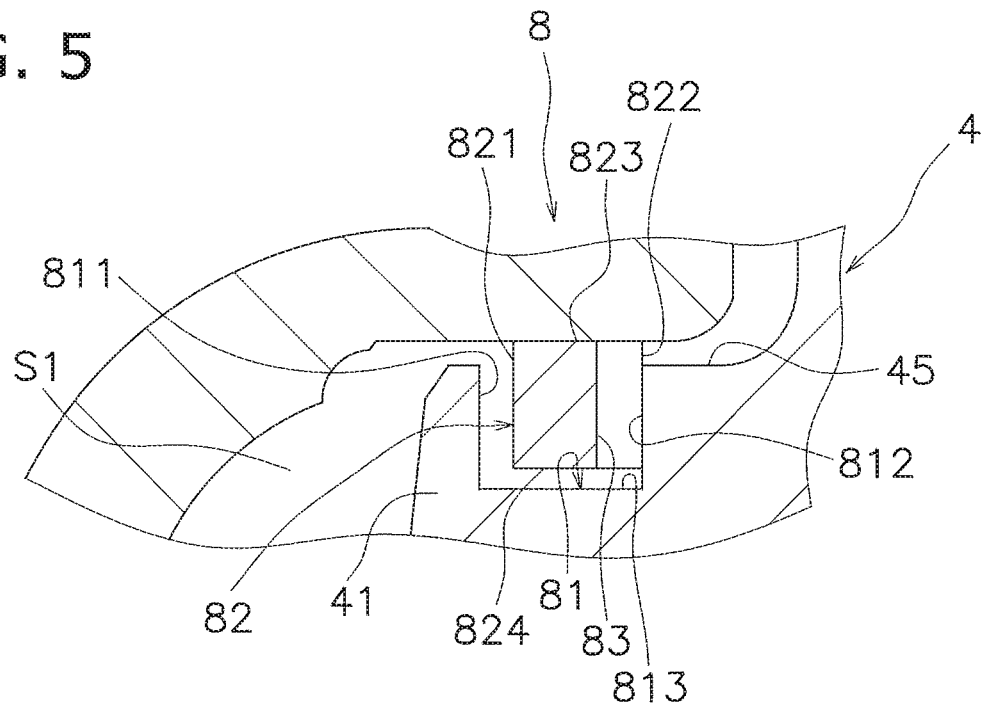
FIG. 5 is a cross-sectional view of a seal mechanism in a lock-up off state.

As shown in FIG. 5, the seal mechanism 8 includes an annular groove 81 and a seal ring 82. The annular groove 81 is provided on the turbine 4. Detailedly, the annular groove 81 is a groove provided on an outer peripheral surface 45 of the turbine shell 41.

The annular groove 81 is delimited by a first inner wall surface 811, a second inner wall surface 812 and a bottom surface 813. The first inner wall surface 811 is an internal hydraulic chamber S1-side inner wall surface. The first inner wall surface 811 faces the impeller 3. In other words, the first inner wall surface 811 is a surface facing the right side in FIG. 5.

The second inner wall surface 812 is an inner wall surface located on the opposite side of the first inner wall surface 811. The second inner wall surface 812 faces the front cover 2. In other words, the second inner wall surface 812 is a surface facing the left side in FIG. 5. The first and second inner wall surfaces 811 and 812 are opposed to each other in a condition that the seal ring 82 is removed. The bottom surface 813 faces radially outward.

The seal ring 82 has an annular shape and is disposed inside the annular groove 81. The seal ring 82 is disposed to be movable in directions approaching to and separating from the internal hydraulic chamber S1. In the present preferred embodiment, the seal ring 82 is disposed inside the annular groove 81 so as to be movable in the axial direction.

The seal ring 82 makes contact at an outer peripheral surface 823 thereof with the inner peripheral surface of the piston 6. Therefore, when the seal ring 82 is moved in the axial direction, the seal ring 82 slides on the inner peripheral surface of the piston 6.

When cut orthogonally to the circumferential direction, the seal ring 82 has a rectangular cross section. The seal ring 82 includes a first lateral surface 821 and a second lateral surface 822. The first lateral surface 821 is opposed to the first inner wall surface 811 of the annular groove 81. In other words, the first lateral surface 821 faces the front cover 2 in the axial direction (leftward in FIG. 5). Contrarily, the second lateral surface 822 is opposed to the second inner wall surface 812 of the annular groove 81. In other words, the second lateral surface 822 faces the impeller 3 in the axial direction (rightward in FIG. 5).

An inner peripheral surface 824 of the seal ring 82 is opposed to the bottom surface 813 of the annular groove 81. Additionally, the inner peripheral surface 824 of the seal ring 82 is disposed at an interval from the bottom surface 813 of the annular groove 81. Therefore, the hydraulic oil is capable of flowing through the space between the inner peripheral surface 824 of the seal ring 82 and the bottom surface 813 of the annular groove 81.

The second lateral surface 822 includes a plurality of oil grooves 83. The oil grooves 83 are disposed away from each other at intervals in the circumferential direction. Each oil groove 83 extends on the second lateral surface 822 in the radial direction. Each oil groove 83 is opened to the external hydraulic chamber S2. Additionally, each oil groove 83 is opened to the space between the inner peripheral surface 824 of the seal ring 82 and the bottom surface 813 of the annular groove 81 as well.

[Hydraulic Circuit]

Next, a hydraulic circuit provided in the torque converter 100 will be explained with FIG. 4. The hydraulic circuit includes a first oil pathway P1, a second oil pathway P2, a third oil pathway P3 and at least one orifice hole 65.

The first oil pathway P1 is formed between the impeller hub 33 and the stator carrier 51. The second oil pathway P2 is formed between the turbine shell 41 and the stator carrier 51. Also, the third oil pathway P3 is formed between the turbine hub 43 and the inner tubular portion 23. It should be noted that the at least one oil groove 11c is provided as part of the third oil pathway P3.

The at least one orifice hole 65 is provided in the inner peripheral part of the piston 6, and penetrates therethrough in the axial direction. The at least one orifice hole 65 makes the external hydraulic chamber S2 and the internal hydraulic chamber S1 communicate with each other therethrough.

[Action]

In a torque converter actuation range that a torque is transmitted from the impeller 3 to the turbine 4 through the hydraulic oil, the hydraulic oil supplied through the third oil pathway P3 flows in a circulation channel of the internal hydraulic chamber S1, the external hydraulic chamber S2, and the first and second oil pathways P1 and P2 in this order. In this case, the torque inputted to the impeller 3 from the front cover 2 is outputted to the input shaft of the transmission through the turbine 4. In the first hydraulic chamber S3 composing part of the external hydraulic chamber S2, the hydraulic oil supplied to the turbine 4 is returned to the impeller 3 while the flow thereof is regulated by the stator 5.

In the aforementioned torque converter actuation range, the lock-up device 10 is kept in an off state (a state in which torque transmission is blocked). When the lock-up device 10 is in the off state, the relation "the internal hydraulic chamber S1>the external hydraulic chamber S2" is established regarding the hydraulic pressures in chambers. Therefore, the piston 6 is not being engaged by friction with the turbine 4. In other words, the pressure receiving portion 44 is not being pressed by the piston 6 through the friction member 9. Therefore, the torque, transmitted from the front cover 2 to the piston 6 through the damper mechanism 7, is not transmitted to the turbine 4.

Thus, when the hydraulic pressure is higher in the internal hydraulic chamber S1 than in the external hydraulic chamber S2, the seal mechanism 8 allows the hydraulic oil to flow from the internal hydraulic chamber S1 to the external hydraulic chamber S2. Specifically, the seal ring 82 has been moved within the annular groove 81 in the direction separating from the internal hydraulic chamber S1 (see FIG. 5). Additionally, the seal ring 82 is disposed in contact at the second lateral surface 822 with the second inner wall surface 812 of the annular groove 81. Here, the second lateral surface 822 of the seal ring 82 includes the oil grooves 83. Hence, the hydraulic oil flows from the internal hydraulic chamber S1 to the external hydraulic chamber S2 through the oil grooves 83. Thus, the hydraulic oil flows in the circulation channel of the internal hydraulic chamber S1, the external hydraulic chamber S2, and the first and second oil pathways P1 and P2 in this order, whereby the first hydraulic chamber S3 can be cooled.

Next, when the rotational speed of the torque converter 100 increases and reaches a predetermined value or greater, the hydraulic oil is stopped from being supplied to the internal hydraulic chamber S1 through the third oil pathway P3, but simultaneously, the hydraulic oil is supplied to the external hydraulic chamber S2 through the first and second oil pathways P1 and P2. Accordingly, the hydraulic pressure gets higher in the external hydraulic chamber S2 (especially, the second hydraulic chamber S4) than in the internal hydraulic chamber S1, whereby the piston 6 is moved toward the turbine 4. As a result, the piston 6 is engaged by friction with the turbine 4, and the lock-up device 10 is turned into the on state. Specifically, the piston 6 presses the pressure receiving portion 44 through the friction member 9, and is thus engaged by friction with the turbine 4. As a result, the torque, transmitted to the piston 6 from the front cover 2 through the damper mechanism 7, is transmitted to the turbine 4.

Figure 6:
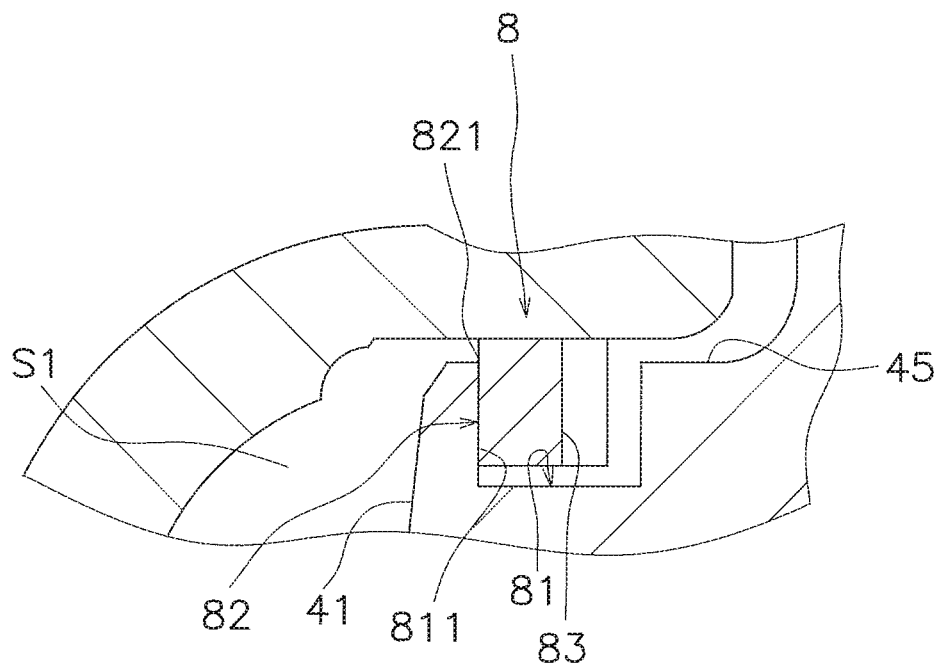
FIG. 6 is a cross-sectional view of the seal mechanism in a lock-up on state.

When the hydraulic pressure is thus higher in the external hydraulic chamber S2 than in the internal hydraulic chamber S1, the seal mechanism 8 blocks the hydraulic oil from flowing between the external hydraulic chamber S2 and the internal hydraulic chamber S1. Specifically, the seal ring 82 has been moved toward the internal hydraulic chamber S1 within the annular groove 81 by the hydraulic pressure in the external hydraulic chamber S2. Additionally, the seal ring 82 is disposed in contact at the first lateral surface 821 with the first inner wall surface 811 of the annular groove 81 (see FIG. 6). Therefore, the hydraulic oil is blocked from flowing from the external hydraulic chamber S2 to the internal hydraulic chamber S1, whereby the hydraulic pressure can be kept higher in the external hydraulic chamber S2 than in the internal hydraulic chamber S1. As a result, it is possible to reliably achieve good responsiveness of the piston 6.

[Modifications]

One preferred embodiment of the present disclosure has been explained above. However, the present advancement is not limited to this, and a variety of changes can be made without departing from the gist of the present advancement.

Figure 7:
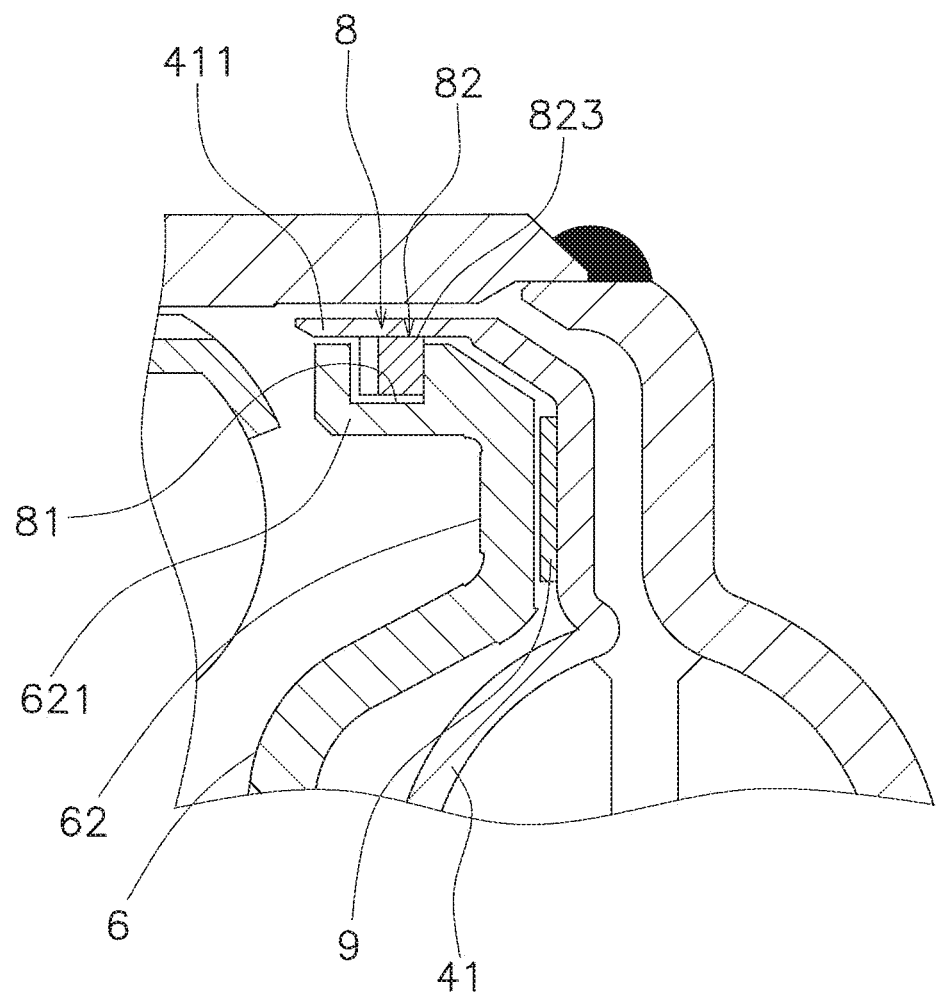
FIG. 7 is a cross-sectional view of a seal mechanism according to a modification.

(a) In the aforementioned preferred embodiment, the seal mechanism 8 is disposed on the inner side of the friction member 9 in the radial direction. However, the layout of the seal mechanism 8 is not limited to this. For example, as shown in FIG. 7, the seal mechanism 8 can be disposed outside the friction member 9 in the radial direction. In this case, the annular groove 81 is provided on the piston 6. Specifically, the annular groove 81 is provided on the outer peripheral surface of the outer peripheral end 621 of the pressure applying portion 62 of the piston 6.

Additionally, the seal ring 82 makes contact at the outer peripheral surface 823 with the inner peripheral surface of the turbine shell 41. Specifically, the turbine shell 41 is bent at an outer peripheral end 411 toward the front cover 2 in the axial direction. In other words, the outer peripheral end 411 of the turbine shell 41 is made in the shape of a cylinder extending in the axial direction. The outer peripheral end 411 of the turbine shell 41 is disposed outside the outer peripheral end 621 of the pressure applying portion 62 in the radial direction. The outer peripheral end 411 of the turbine shell 41 makes contact at the inner peripheral surface thereof with the outer peripheral surface 823 of the seal ring 82. It should be noted that when the seal ring 82 is moved toward the internal hydraulic chamber S1, this means that the seal ring 82 is moved toward the impeller 3 (rightward in FIG. 7).

(b) In the aforementioned preferred embodiment, the oil grooves 83 are provided on the second lateral surface 822 of the seal ring 82. However, the configuration of the oil grooves 83 is not limited to this. For example, the oil grooves 83 can be provided on the second inner wall surface 812 of the annular groove 81.

(c) In the aforementioned preferred embodiment, the plural oil grooves 83 are provided. However, the number of the oil grooves 83 is not limited to this. Alternatively, only one oil groove 83 might be provided.

(d) In the aforementioned preferred embodiment, the seal ring 82 is disposed not in contact at the inner peripheral surface 824 with the bottom surface 813 of the annular groove 81. Alternatively, the seal ring 82 can be disposed in contact at the inner peripheral surface 824 with the bottom surface 813 of the annular groove 81. In this case, one or more other grooves can be provided on the inner peripheral surface 824 of the seal ring 82 so as to communicate with the oil grooves 83.

(e) The seal mechanism 8 is not limited to the aforementioned preferred embodiment. For example, a reed valve, which is a type of one-way valve, can be provided as the seal mechanism 8.

What is claimed is:

1. A torque converter comprising:
   a front cover;
   an impeller fixed to the front cover;
   a turbine disposed in opposition to the impeller;
   a piston disposed between the front cover and the turbine so as to be movable in an axial direction, the piston configured to be engaged by friction with the turbine;
   an internal hydraulic chamber delimited by the turbine and the piston;
   an external hydraulic chamber obtained by excluding the internal hydraulic chamber from a hydraulic chamber delimited by the front cover and the impeller; and
   a seal mechanism disposed between the turbine and the piston, the seal mechanism blocking hydraulic oil from flowing into the internal hydraulic chamber from the external hydraulic chamber.

2. The torque converter according to claim 1, wherein the seal mechanism allows the hydraulic oil from flowing out of the internal hydraulic chamber to the external hydraulic chamber.

3. The torque converter according to claim 1, wherein the seal mechanism blocks the hydraulic oil from flowing between the external hydraulic chamber and the internal hydraulic chamber when a hydraulic pressure is higher in the external hydraulic chamber than in the internal hydraulic chamber, the seal mechanism allowing the hydraulic oil to flow between the external hydraulic chamber and the internal hydraulic chamber when the hydraulic pressure is higher in the internal hydraulic chamber than in the external hydraulic chamber.

4. The torque converter according to claim 1, wherein
the seal mechanism includes an annular groove and a seal ring, the annular groove provided on one of the piston and the turbine, the seal ring movable in directions approaching to and separating from the internal hydraulic chamber within the annular groove, the annular groove is delimited by a bottom surface, a first inner wall surface and a second inner wall surface, the first inner wall surface located on an internal hydraulic chamber side, the second inner wall surface located on an opposite side of the first inner wall surface, the seal ring includes a first lateral surface, a second lateral surface, an inner peripheral surface and an outer peripheral surface, the first lateral surface opposed to the first inner wall surface, the second lateral surface opposed to the second inner wall surface, the inner peripheral surface opposed to the bottom surface, the outer peripheral surface making contact with the other of the piston and the turbine, and either the second inner wall surface or the second lateral surface includes an oil groove.

5. The torque converter according to claim 1, further comprising:
a friction member attached to either the turbine or the piston.

6. The torque converter according to claim 5, wherein the seal mechanism is disposed on an inner side of the friction member in a radial direction.

7. The torque converter according to claim 5, wherein the seal mechanism is disposed on an outer side of the friction member in a radial direction.

8. The torque converter according to claim 1, wherein
the front cover includes a disc portion and an inner tubular portion extending from an inner peripheral end of the disc portion in the axial direction, the turbine includes a turbine hub disposed on an inner side of the inner tubular portion in a radial direction, the piston is disposed on an outer peripheral surface of the inner tubular portion so as to slide thereon in the axial direction, and the torque converter further comprises a bearing member disposed between the turbine hub and the inner tubular portion in the radial direction.

9. The torque converter according to claim 8, wherein the bearing member is disposed between the turbine hub and the disc portion in the axial direction.

10. The torque converter according to claim 8, wherein the bearing member includes an oil groove communicating with the internal hydraulic chamber.

11. The torque converter according to claim 1, wherein the piston is engaged by friction with an outer peripheral end of the turbine.

12. The torque converter according to claim 1, further comprising:
a damper mechanism coupling the piston and the front cover.

* * * * *